United States Patent
Kobayashi

(10) Patent No.: US 8,407,161 B2
(45) Date of Patent: Mar. 26, 2013

(54) RECOMMENDATION DEVICE, METHOD, AND PROGRAM USING METADATA

(75) Inventor: Yoshiyuki Kobayashi, Tokyo (JP)

(73) Assignee: Sony Corporation, Tokyo (JP)

( * ) Notice: Subject to any disclaimer, the term of this patent is extended or adjusted under 35 U.S.C. 154(b) by 610 days.

(21) Appl. No.: 12/494,517

(22) Filed: Jun. 30, 2009

(65) Prior Publication Data

US 2010/0010942 A1    Jan. 14, 2010

(30) Foreign Application Priority Data

Jul. 8, 2008    (JP) ................................. P2008-177847

(51) Int. Cl.
    *G06F 15/18*    (2006.01)
(52) U.S. Cl. ........................................................ 706/12
(58) Field of Classification Search ........................ None
    See application file for complete search history.

(56) References Cited

U.S. PATENT DOCUMENTS

2009/0100455 A1*    4/2009    Frikker et al. .................. 725/13

FOREIGN PATENT DOCUMENTS

| JP | 2005-352991 | 12/2005 |
|----|-------------|---------|
| JP | 2006-243916 | 9/2006  |
| JP | 2006-323733 | 11/2006 |
| JP | 2007-122186 | 5/2007  |

OTHER PUBLICATIONS

Paul Allison, "Missing Data Techniques for Structural Equation Modeling", 2003, Journal of Abnormal Psychology, vol. 112 No. 4, pp. 545-557.*

* cited by examiner

*Primary Examiner* — David Vincent
*Assistant Examiner* — Paulinho E Smith
(74) *Attorney, Agent, or Firm* — Finnegan, Henderson, Farabow, Garrett & Dunner, L.L.P.

(57) ABSTRACT

An information processing device includes a first learning unit, a first error modeling unit, a first error generation unit, and a first estimation unit. The first learning unit learns a first estimation formula for estimating a first target variable of content on the basis of the feature quantity of the content. The first error modeling unit determines a first model of an error generated in the estimation of the first target variable based on the first estimation formula learned by the first learning unit. The first error generation unit generates, with the use of a random number, an error according to the first model determined by the first error modeling unit. The first estimation unit estimates the first target variable of the content by using the first estimation formula learned by the first learning unit and the random number generated by the first error generation unit.

9 Claims, 18 Drawing Sheets

FIG. 2

METADATA (p TYPES)

| | CHEERFULNESS | FAST PACE | BITTERSWEETNESS | CALMNESS | ... | SADNESS |
|---|---|---|---|---|---|---|
| MUSIC 1 | 1 | | | | | |
| MUSIC 2 | | | 4 | | | |
| MUSIC 3 | | 3 | | | | |
| MUSIC 4 | | | | | | |
| MUSIC 5 | | | | | | |
| MUSIC 6 | | | | 1 | | 5 |
| MUSIC 7 | | | 3 | | | |
| ... | | | | | | |
| MUSIC n | 2 | | | | | |

FIG. 3

| | PREFERENCE |
|---|---|
| MUSIC 1 | |
| MUSIC 2 | |
| MUSIC 3 | 3 |
| MUSIC 4 | 5 |
| MUSIC 5 | |
| MUSIC 6 | |
| MUSIC 7 | |
| ... | |
| MUSIC n | |

FIG. 4

MUSIC PIECES ASSIGNED WITH LABEL FOR METADATA "CHEERFULNESS"

| | METADATA LABEL $M_j$ | FEATURE QUANTITIES $X_1$ TO $X_m$ OF MUSIC PIECES | | | | | |
|---|---|---|---|---|---|---|---|
| | CHEERFULNESS | FEATURE QUANTITY $X_1$ | FEATURE QUANTITY $X_2$ | FEATURE QUANTITY $X_3$ | FEATURE QUANTITY $X_4$ | ... | FEATURE QUANTITY $X_m$ |
| MUSIC 1 | 1 | 0.972581 | 0.097583 | 0.507911 | 0.931876 | | 0.508711 |
| MUSIC 24 | 5 | 0.645999 | 0.342067 | 0.606237 | 0.912835 | | 0.248291 |
| MUSIC 41 | 4 | 0.944397 | 0.243834 | 0.514618 | 0.812528 | | 0.046131 |
| MUSIC 89 | 2 | 0.264819 | 0.971928 | 0.705046 | 0.465513 | | 0.274859 |
| MUSIC 120 | 3 | 0.743882 | 0.079987 | 0.085978 | 0.612616 | | 0.744451 |
| MUSIC 649 | 1 | 0.24799 | 0.475991 | 0.134296 | 0.754727 | | 0.644195 |
| MUSIC 722 | 4 | 0.919499 | 0.364159 | 0.523439 | 0.71969 | | 0.103587 |
| ... | | | | | | | |
| MUSIC n | 2 | 0.654266 | 0.217916 | 0.058997 | 0.134703 | | 0.71094 |

FIG. 5

| | FEATURE QUANTITIES $X_1$ TO $X_m$ OF MUSIC 2 | | | | | |
|---|---|---|---|---|---|---|
| | FEATURE QUANTITY $X_1$ | FEATURE QUANTITY $X_2$ | FEATURE QUANTITY $X_3$ | FEATURE QUANTITY $X_4$ | ... | FEATURE QUANTITY $X_m$ |
| MUSIC 2 | 0.19873 | 0.441487 | 0.957761 | 0.730886 | | 0.965423 |

FIG. 6

| | PREFERENCE LABEL | ESTIMATED METADATA LABELS M₁" TO Mₚ" WITHOUT RANDOM NUMBER (TERM OF NRN) | | | | | |
|---|---|---|---|---|---|---|---|
| | PREFERENCE | CHEERFULNESS | FAST PACE | BITTERSWEETNESS | CALMNESS | ... | SADNESS |
| MUSIC 3 | 3 | 2.55268 | 3.369203 | 3.914696 | 6.843549 | | 4.518374 |
| MUSIC 4 | 5 | 4.069539 | 3.459106 | 1.5061 | 2.185506 | | 1.39964 |
| MUSIC 346 | 2 | 2.066245 | 0.999575 | 5.895135 | 2.535628 | | 0.008185 |
| MUSIC 356 | 1 | 2.708402 | 4.505317 | 4.077874 | 0.782063 | | 0.133495 |
| MUSIC 932 | 5 | 2.850002 | 3.862376 | 3.304665 | 2.134882 | | 1.583224 |
| ... | | | | | | | |
| MUSIC 2697 | 4 | 3.86498 | 2.222744 | 1.975527 | 4.822022 | | 1.061872 |

(MUSIC PIECES ASSIGNED WITH LABEL FOR PREFERENCE)

FIG. 7

| | ESTIMATED METADATA LABELS M₁" TO Mₚ" OF MUSIC 2 | | | | |
|---|---|---|---|---|---|
| | CHEERFULNESS | FAST PACE | BITTERSWEETNESS | CALMNESS | ... | SADNESS |
| MUSIC 2 | 7.021681 | -0.83549 | 4.272989 | 4.422167 | | 4.100304 |

FIG. 8

|  | ESTIMATED METADATA LABEL OF "CHEERFULNESS" | ESTIMATED PREFERENCE LABEL |
|---|---|---|
| MUSIC 1 | 1.572455 | 0.74475 |
| MUSIC 2 | 4.091668 | 1.797408 |
| MUSIC 3 | 5.401227 | 2.917858 |
| MUSIC 4 | 2.467377 | 4.784089 |
| MUSIC 5 | 5.374316 | 2.415111 |
| MUSIC 6 | 3.211868 | 3.564548 |
| ... | | |
| MUSIC n | 2.249518 | 5.076248 |

FIG. 11

| | ESTIMATED PREFERENCE LABEL |
|---|---|
| MUSIC 1 | 0.74475 |
| MUSIC 2 | 1.797408 |
| MUSIC 3 | 2.917858 |
| MUSIC 4 | 4.784089 |
| MUSIC 5 | 2.415111 |
| MUSIC 6 | 5.025381 |
| MUSIC 7 | −2.2298 |
| MUSIC 8 | 3.564548 |
| ... | |
| MUSIC n | 5.076248 |

RECOMMENDATION DEVICE, METHOD, AND PROGRAM USING METADATA

BACKGROUND OF THE INVENTION

1. Field of the Invention

The present invention relates to an information processing device, an information processing method, and a program, particularly to an information processing device, an information processing method, and a program capable of providing an estimation result with appropriate randomness.

2. Description of the Related Art

A technique of estimating, on the basis of the metadata of a known content item, the unknown metadata of another content item has been proposed in the past by the present applicant (see Japanese Unexamined Patent Application Publication No. 2007-122186, for example). This estimation of the metadata is used in, for example, recommendation processing of recommending the most suitable content to a user.

For example, in an example in which the content is music, machine learning for creating a metadata estimation formula on the basis of the feature quantity of a music piece is performed, and the feature quantity of a predetermined music piece is input to the metadata estimation formula created by the machine learning. Thereby, the unknown metadata of the music piece can be estimated. Herein, the feature quantity of a music piece refers to the value obtained by the calculation of the data (signal) of the music piece with the use of a predetermined feature quantity calculation formula. Further, the metadata of a music piece refers to the value representing a feature of the music piece corresponding to user perception of the music piece, such as cheerfulness, bittersweetness, sadness, and fast pace.

Therefore, if the estimated metadata includes "cheerfulness" representing the degree of cheerfulness of a music piece, and if a user searches for "cheerful" music pieces, for example, a search device can calculate (estimate) the degree of the metadata "cheerfulness" for each of content items stored by the user on the basis of the metadata estimation formula, and can present to the user music pieces sorted in descending order of the degree.

In this type of estimation of the metadata, however, the metadata of a music piece is estimated solely on the basis of the feature quantity of the music piece. Therefore, it is naturally difficult to estimate the metadata with 100% accuracy. That is, the estimation result usually includes an error. In the above-described case in which the user searches for "cheerful" music pieces, the presentation order of the presented "cheerful" music pieces includes an error. It is therefore difficult to guarantee that the presentation order truly reflects the order of "cheerful" music pieces.

SUMMARY OF THE INVENTION

Further, in the estimation of the metadata according to the related art, when the user searches for "cheerful" music pieces, the degree of the metadata "cheerfulness" of each of content items calculated by the search device is represented by the same value each time, unless the metadata estimation formula created by the machine learning is changed. Therefore, the search device presents to the user the content items in the same sort order each time. This presentation raises an issue in that the user gets bored with what is presented.

To address the above-described issue, a method has been proposed which rearranges the content items at random while maintaining, to some degree, the original order of the metadata "cheerfulness." However, there is no ground for the rearrangement. Thus, the rearrangement may result in an inappropriate search result (presentation). That is, due to the rearrangement, a music piece having a low degree of "cheerfulness" is presented above a music piece having a high degree of "cheerfulness" in some cases.

A similar issue arises also when music pieces preferred by the user are estimated and recommended (presented) with the use of such factors as cheerfulness, bittersweetness, sadness, and fast pace as the feature quantities of music pieces, and also with the use of such labels as "like" and "dislike" as the metadata.

The present invention has been made in view of the above-described circumstances. It is desirable to provide an estimation result with appropriate randomness.

An information processing device according to an embodiment of the present invention includes first learning means, first error modeling means, first error generation means, and first estimation means. The first learning means learns a first estimation formula for estimating a first target variable of content on the basis of the feature quantity of the content. The first error modeling means determines a first model of an error generated in the estimation of the first target variable based on the first estimation formula learned by the first learning means. The first error generation means generates, with the use of a random number, an error according to the first model determined by the first error modeling means. The first estimation means estimates the first target variable of the content by using the first estimation formula learned by the first learning means and the random number generated by the first error generation means.

The information processing device according to an embodiment of the present invention may further include search means for searching for content by using the first target variable of the content estimated by the first estimation means.

The information processing device according to an embodiment of the present invention may further include second learning means, second error modeling means, second error generation means, and second estimation means. The second learning means learns a second estimation formula for estimating a second target variable, by using the first target variable obtained solely by the use of the first estimation formula learned by the first learning means. The second error modeling means determines a second model of an error generated in the estimation of the second target variable based on the second estimation formula learned by the second learning means. The second error generation means generates, with the use of a random number, an error according to the second model determined by the second error modeling means. The second estimation means estimates the second target variable of the content by using the second estimation formula learned by the second learning means and the random number generated by the second error generation means.

The information processing device according to an embodiment of the present invention may further include recommendation means for recommending content by using the second target variable of the content estimated by the second estimation means.

An information processing method according to an embodiment of the present invention includes the steps of: learning a first estimation formula for estimating a first target variable of content on the basis of the feature quantity of the content; determining a first model of an error generated in the estimation of the first target variable based on the learned first estimation formula; generating, with the use of a random number, an error according to the determined first model; and estimating the first target variable of the content by using the learned first estimation formula and the generated random number.

A program according to an embodiment of the present invention causes a computer to perform processing including the steps of: learning a first estimation formula for estimating a first target variable of content on the basis of the feature quantity of the content; determining a first model of an error generated in the estimation of the first target variable based on the learned first estimation formula; generating, with the use of a random number, an error according to the determined first model; and estimating the first target variable of the content by using the learned first estimation formula and the generated random number.

In an embodiment of the present invention, a first estimation formula for estimating a first target variable of content on the basis of the feature quantity of the content is learned, and a first model of an error generated in the estimation of the first target variable based on the learned first estimation formula is determined. Further, an error according to the determined first model is generated with the use of a random number, and the first target variable of the content is estimated with the use of the learned first estimation formula and the generated random number.

According to an embodiment of the present invention, it is possible to provide an estimation result with appropriate randomness.

BRIEF DESCRIPTION OF THE DRAWINGS

FIG. 2 is a diagram illustrating an example of data stored in a metadata label DB;

FIG. 3 is a diagram illustrating an example of data stored in a preference label DB;

FIG. 4 is a diagram illustrating an example of data generated by a metadata estimation formula learning unit;

FIG. 5 is a diagram illustrating an example of the feature quantities of a music piece acquired from a music DB;

FIG. 6 is a diagram illustrating an example of preference labels and estimated metadata labels of music pieces;

FIG. 7 is a diagram illustrating an example of the estimated metadata labels of a music piece;

FIG. 8 is a diagram illustrating an example of the estimated metadata labels and estimated preference labels in search processing;

FIG. 11 is a diagram illustrating an example of the estimated preference labels in recommendation processing;

DESCRIPTION OF THE PREFERRED EMBODIMENTS

Figure 1:
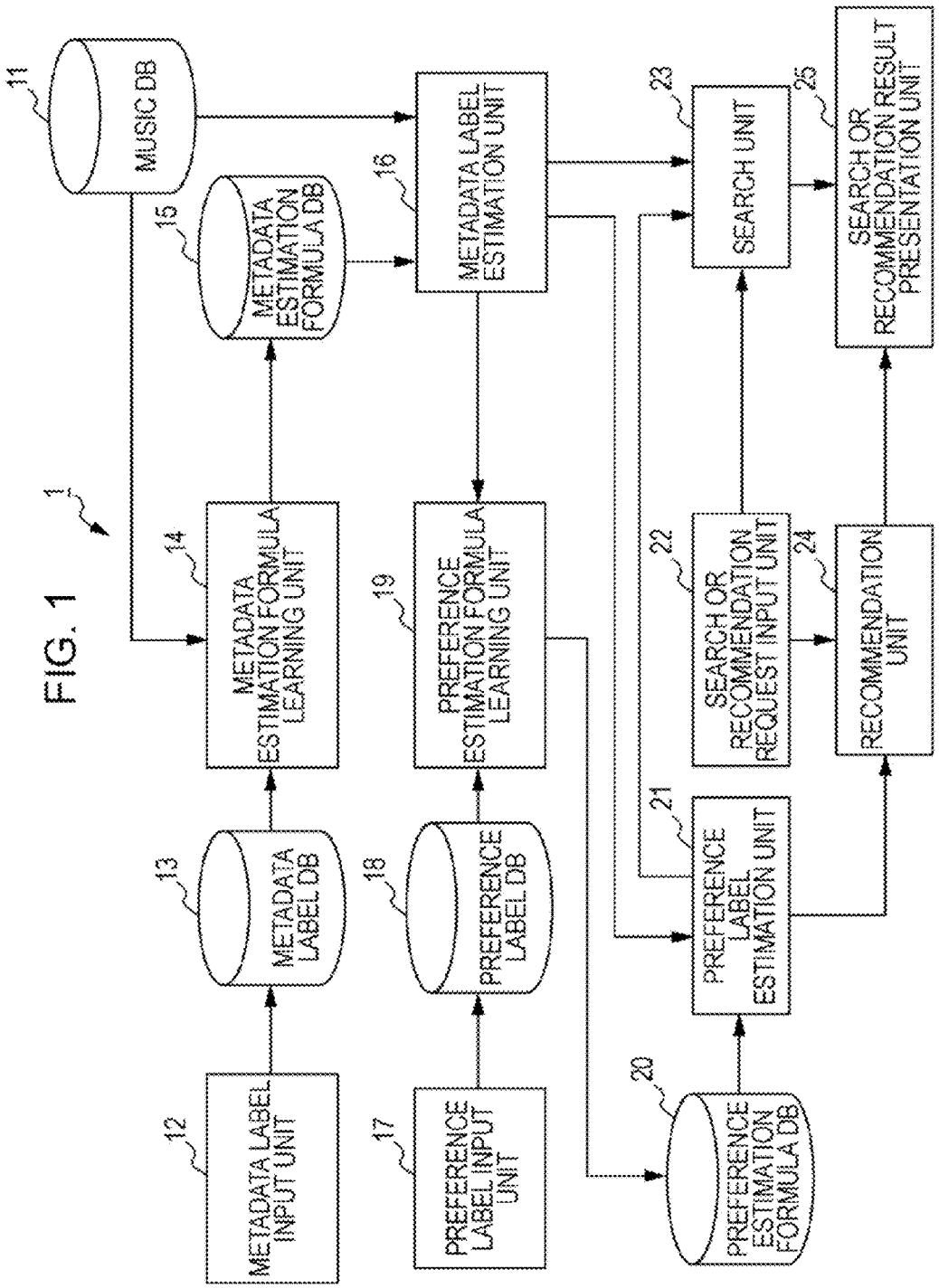
FIG. 1 is a block diagram illustrating a configuration example of an information processing device to which an embodiment of the present invention is applied.

FIG. 1 illustrates a configuration example of an information processing device to which an embodiment of the present invention is applied.

An information processing device 1 of FIG. 1 performs content search processing and content recommendation processing. The following description will be made of the configuration and the operation of the information processing device 1, wherein music is taken as an example of the content. The content search processing and the content recommendation processing described below can also be applied to content other than music, such as image.

The information processing device 1 is configured to include, at least, a music DB (Data Base) 11, a metadata label input unit 12, a metadata label DB 13, a metadata estimation formula learning unit 14, a metadata estimation formula DB 15, a metadata label estimation unit 16, a preference label input unit 17, a preference label DB 18, a preference estimation formula learning unit 19, a preference estimation formula DB 20, a preference label estimation unit 21, a search or recommendation request input unit 22, a search unit 23, a recommendation unit 24, and a search or recommendation result presentation unit 25.

The music DB 11 stores the data of a multitude of music pieces (music data) input from a not-illustrated music input unit, together with the feature quantities of the music pieces. Herein, the feature quantity of a music piece refers to the value obtained by the calculation of the data (signal) of the music piece with the use of a predetermined feature quantity calculation formula. The feature quantity may be input together with the music data. Alternatively, only the music data may be input, and the feature quantity may be calculated by the use of a predetermined feature quantity calculation formula using the input music data. It is assumed in the present embodiment that the music DB 11 stores the n number of music pieces (n>0) and the m types of feature quantities (m>0) for each of the music pieces.

The metadata label input unit 12 receives user-input metadata labels of the music pieces stored in the music DB 11, and supplies the metadata labels to the metadata label DB 13.

The metadata label refers to the value representing the degree of the metadata of a music piece. The metadata includes cheerfulness, bittersweetness, sadness, fast pace, and so forth, each of which is a feature of a music piece corresponding to user perception of the music piece. Herein, the metadata is divided into the p types (p>0). Further, possible values of the metadata label are one to five. The user inputs the value "1" when the metadata (e.g., cheerfulness) does not apply to the music piece at all, the value "2" when the metadata does not apply to the music piece, the value "3" when it is difficult to determine whether or not the metadata applies to the music piece, the value "4" when the metadata applies to the music piece, and the value "5" when the metadata highly applies to the music piece. Therefore, the metadata label of a music piece refers to the value representing the degree of cheerfulness, bittersweetness, sadness, fast pace, or the like, of the music piece.

The metadata label DB 13 stores the metadata labels of the music pieces supplied by the metadata label input unit 12. It is unnecessary to assign the metadata label to each of the music pieces stored in the music DB 11.

The metadata estimation formula learning unit 14 performs linear regression using the metadata labels of the music pieces stored in the metadata label DB 13 and the m types of feature quantities, to thereby derive a metadata estimation formula for estimating the metadata. That is, the metadata estimation formula learning unit 14 acquires from the metadata label DB 13 the metadata labels of the music pieces stored in the music DB 11, and acquires from the music DB 11 the m types of feature quantities of the music pieces. Then, the metadata estimation formula learning unit 14 derives, through linear regression, the metadata estimation formula for estimating the metadata.

The metadata estimation formula learning unit 14 derives the metadata estimation formula for each of the p types of metadata, and supplies the metadata estimation formula to the metadata estimation formula DB 15. The metadata estimation formula DB 15 stores the metadata estimation formulae supplied by the metadata estimation formula learning unit 14. To store a metadata estimation formula means to store parameters for identifying the metadata estimation formula. This also applies to a preference estimation formula described later.

With the use of the metadata estimation formulae stored in the metadata estimation formula DB 15, the metadata label estimation unit 16 calculates (estimates) the unknown metadata of the music pieces stored in the music DB 11. More specifically, the metadata label estimation unit 16 acquires from the music DB 11 the feature quantities of each of the music pieces, for which the metadata is to be calculated, and substitutes the feature quantities in the metadata estimation formula using the feature quantities of the music piece as variables, to thereby calculate the unknown metadata. The calculated metadata of the music piece is supplied, as appropriate, to the preference estimation formula learning unit 19, the preference label estimation unit 21, or the search unit 23.

The preference label input unit 17 receives user-input preference labels of the music pieces stored in the music DB 11, and supplies the preference labels to the preference label DB 18. The preference label DB 18 stores the preference labels of the music pieces supplied by the preference label input unit 17. It is also unnecessary to assign the preference label to each of the music pieces stored in the music DB 11.

The preference label refers to the value representing the degree of preference of a music piece. The user inputs the value "1" when the user hates the input music piece, the value "2" when the user dislikes the music piece, the value "3" when it is difficult to determine whether or not the user likes the music piece, the value "4" when the user likes the music piece, and the value "5" when the user loves the music piece.

The preference estimation formula learning unit 19 performs linear regression using the preference labels of the music pieces stored in the preference label DB 18, to thereby derive a preference estimation formula for estimating the preference label. Specifically, the preference estimation formula learning unit 19 performs linear regression using the preference labels of the music pieces stored in the preference label DB 18 and the p types of metadata labels supplied by the metadata label estimation unit 16, to thereby derive the preference estimation formula for estimating the preference label.

The metadata labels supplied by the metadata label estimation unit 16 have been estimated on the basis of the metadata estimation formulae derived by the metadata estimation formula learning unit 14 (hereinafter referred to as the estimated metadata labels). The derived preference estimation formulae are supplied to and stored in the preference estimation formula DB 20.

With the use of the preference estimation formulae stored in the preference estimation formula DB 20, the preference label estimation unit 21 estimates the preference label of a predetermined music piece. The estimated preference label of the music piece (hereinafter referred to as the estimated preference label) is used in the music search by the search unit 23 and the music recommendation by the recommendation unit 24. Therefore, the preference label estimation unit 21 estimates the preference labels of a plurality of music pieces and supplies the estimated preference labels to the search unit 23 or the recommendation unit 24, as appropriate.

The search or recommendation request input unit 22 receives a request from the user for the music search or recommendation, and supplies the search or recommendation request to the search unit 23 or the recommendation unit 24. For example, if the search or recommendation request input unit 22 receives a user-input (specified) search request for cheerful and fast-paced music pieces, the search or recommendation request input unit 22 outputs the search request to the search unit 23 together with the condition for the search. Further, for example, if the search or recommendation request input unit 22 receives a user-input (specified) recommendation request for favorite music pieces, the search or recommendation request input unit 22 outputs the recommendation request to the recommendation unit 24.

The search unit 23 supplies, as the search result, a list of music pieces selected from the music pieces stored in the music DB 11 and satisfying the search condition supplied by the search or recommendation request input unit 22, to the search or recommendation result presentation unit 25. More in detail, the search unit 23 acquires from the metadata label estimation unit 16 the estimated metadata labels of the music pieces stored in the music DB 11, and acquires from the preference label estimation unit 21 the estimated preference labels of the music pieces. Then, on the basis of the acquired estimated metadata labels and estimated preference labels, the search unit 23 searches for the music pieces satisfying the search condition. The search unit 23 can cause the metadata label estimation unit 16 to calculate the estimated metadata labels of the music pieces and cause the preference label estimation unit 21 to calculate the estimated preference labels of the music pieces, as appropriate.

Upon receipt of the recommendation request supplied by the search or recommendation request input unit 22, the recommendation unit 24 supplies the recommendation result of the music pieces stored in the music DB 11 to the search or recommendation result presentation unit 25. More in detail, the recommendation unit 24 acquires from the preference label estimation unit 21 the estimated preference labels of the music pieces stored in the music DB 11, and supplies, as the recommendation result, a list of music pieces sorted in descending order of the estimated preference labels, to the search or recommendation result presentation unit 25. Similarly to the search unit 23, the recommendation unit 24 can also cause the preference label estimation unit 21 to calculate the estimated preference labels of the music pieces, as appropriate.

The search or recommendation result presentation unit 25 presents to the user the search result supplied by the search unit 23 or the recommendation result supplied by the recommendation unit 24. Specifically, the search or recommendation result presentation unit 25 displays, on a screen, the music list as the search or recommendation result, or reproduces the music pieces in the order of the music list as the search or recommendation result.

In the information processing device 1 configured as described above, the metadata estimation formulae and the preference estimation formulae can be created on the basis of the input metadata labels and preference labels of some of the music pieces stored in the music DB 11. Further, with the use of the metadata estimation formulae and the preference estimation formulae, the metadata and the preference labels of all of the music pieces stored in the music DB 11 can be estimated. Further, on the basis of the estimated metadata and preference labels of the music pieces, the music search result and the music recommendation result can be presented to the user.

In the presentation of the music search result and the music recommendation result by the information processing device 1, an error in the metadata estimation formula and the preference estimation formula is included in the calculation of the search processing and the recommendation processing. Thereby, the music search result and the music recommendation result can be provided with appropriate randomness, and a diversity of search results and recommendation results can be presented to the user.

With reference to FIGS. 2 to 12, detailed processing performed by the respective blocks of the information processing device 1 will be described.

FIG. 2 illustrates an example of data stored in the metadata label DB 13.

The metadata label DB 13 stores the metadata labels of the music pieces input to the metadata label input unit 12 by the user. The metadata is divided into the p types including "cheerfulness," "fast pace," "bittersweetness," "calmness," "sadness," and so forth.

As described above, it is unnecessary to assign the metadata label to each of the music pieces stored in the music DB 11. Further, it is unnecessary to assign the metadata label to each of the metadata types of a music piece. Therefore, in Music 1, for example, only the metadata "cheerfulness" is assigned with the value "1" indicating that the metadata "does not apply to the music piece at all." Further, in Music 4 and Music 5, for example, any one of the metadata types is not assigned with the metadata label.

FIG. 3 illustrates an example of data stored in the preference label DB 18.

The preference label DB 18 stores the preference labels of the music pieces input to the preference label input unit 17 by the user. In the example of FIG. 3, the value "3" indicating that "it is difficult to determine whether or not the user likes the music piece" is stored for Music 3, and the value "5" indicating that "the user loves the music piece" is stored for Music 4. As described above, it is also unnecessary to assign the preference label to each of the music pieces stored in the music DB 11. Therefore, only some of the music pieces are assigned with the preference label.

Subsequently, the processing of the metadata estimation formula learning unit 14 will be described.

The metadata estimation formula learning unit 14 determines one of the metadata types, for which the metadata estimation formula has not been derived, as the metadata for which the metadata estimation formula is to be derived (hereinafter referred to as the target metadata). The metadata estimation formula learning unit 14 performs the processing of deriving the metadata estimation formula for each of the p types of metadata. That is, all of the p types of metadata are sequentially set to be the target metadata.

The metadata estimation formula learning unit 14 acquires from the metadata label DB 13 a metadata label $M_j$ of each of music pieces assigned with the label (metadata label) for the target metadata. Further, the metadata estimation formula learning unit 14 acquires from the music DB 11 the m types of feature quantities $X_1$ to $X_m$ of each of the music pieces, the metadata label $M_j$ of which has been acquired from the metadata label DB 13. Then, the metadata estimation formula learning unit 14 associates the metadata label $M_j$ with the feature quantities $X_1$ to $X_m$ for each of the acquired music pieces.

FIG. 4 illustrates an example of data in which the target metadata is the metadata "cheerfulness," and the metadata label $M_j$ of each of predetermined music pieces acquired from the metadata label DB 13 is associated with the feature quantities $X_1$ to $X_m$ of the music piece acquired from the music DB 11. The association between a music piece (the feature quantities thereof) stored in the music DB 11 and a music piece (the metadata label thereof) stored in the metadata label DB 13 is recognizable on the basis of the title of the music piece, the registration order, the index number for identifying the music piece, or the like.

Then, the metadata estimation formula learning unit 14 performs linear regression using the feature quantities $X_1$ to $X_m$ of each of the music pieces, to thereby derive a regression formula for estimating a metadata label $M_j'$ of the target metadata.

Specifically, when the linear combination coefficients are represented as $b_{j0}$ and $b_{j1}$ to $b_{jm}$ and the error between the metadata label $M_j$ already known as a true value and the estimated value $M_j'$ estimated from the regression formula in this case is represented as $e_j$, the metadata label $M_j$ can be expressed by the following formula (1) using the feature quantities $X_1$ to $X_m$.

Formula 1

$$M_j = \sum_{i=1}^{m} b_{ji} X_i + b_{j0} + e_j \tag{1}$$

The metadata estimation formula learning unit 14 substitutes the metadata label $M_j$ and the feature quantities $X_1$ to $X_m$ of each of the music pieces listed in FIG. 4 in the formula (1). As a result, the formula (1), in which the metadata label $M_j$ and the feature quantities $X_1$ to $X_m$ have been substituted, is created for each of the music pieces assigned with the metadata label for the metadata "cheerfulness." Then, the metadata estimation formula learning unit 14 solves the formula (1), in which the metadata label $M_j$ and the feature quantities $X_1$ to $X_m$ have been substituted, for each of the music pieces assigned with the metadata label for the metadata "cheerfulness." Thereby, the linear combination coefficients $b_{j0}$ and $b_{j1}$ to $b_{jm}$ are calculated. That is, the metadata estimation formula learning unit 14 calculates the linear combination coefficients $b_{j0}$ and $b_{j1}$ to $b_m$ for minimizing the error $e_j$ (square error $e_j^2$).

After the linear combination coefficients $b_{j0}$ and $b_{j1}$ to $b_{jm}$ have been calculated, the calculated linear combination coefficients $b_{j0}$ and $b_{j1}$ to $b_{jm}$ and the metadata label $M_j$ and the feature quantities $X_1$ to $X_m$ of each of the music pieces are substituted in the formula (1). Thereby, the error $e_j$ can be obtained for the metadata label $M_j$ of each of the music pieces. With the use of the actual error $e_j$ in each of the music pieces as a sample, the metadata estimation formula learning unit 14 models an estimation error generated in the use of the regression formula of the estimated metadata label $M_j'$ by using a normal distribution (Gaussian distribution). The distribution of the estimation error of the estimated metadata label $M_j'$ calculated here is assumed to be a normal distribution having an average $\mu_j$ and a dispersion $\sigma_j^2$.

In accordance with the above description, the estimated metadata label $M_j'$ representing the estimated value of the label of the j-th metadata type as the target metadata can be expressed by the following formula (2).

Formula 2

$$M_j' = \sum_{i=1}^{m} b_{ji} X_i + b_{j0} + NRN(\mu_j, \sigma_j^2) \quad (2)$$

Herein, $NRN(\mu_j, \sigma_j^2)$ represents a normal random number generation function with the average $\mu_j$ and the dispersion $\sigma_j^2$.

The formula (2) generalized for the k-th music piece (i.e., Music k) of the n number of music pieces can be expressed by the formula (3).

Formula 3

$$M_{jk}' = \sum_{i=1}^{m} b_{ji} X_{ki} + b_{j0} + NRN(\mu_j, \sigma_j^2) \quad (3)$$

In the formula (3), $M_{jk}'$ represents the j-th estimated metadata label of Music k, and $X_{ki}$ represents the i-th feature quantity of Music k.

The linear combination coefficients $b_{j0}$ and $b_{j1}$ to $b_{jm}$ for calculating the estimated metadata label $M_j'$ and the average $\mu_j$ and the dispersion $\sigma_j^2$ for identifying the estimation error distribution, which have been calculated by the metadata estimation formula learning unit 14 as described above, are supplied to and stored in the metadata estimation formula DB 15, as the parameters for calculating the estimated metadata label $M_j'$.

Subsequently, the processing of the metadata label estimation unit 16 will be described.

The metadata label estimation unit 16 acquires from the music DB 11 the feature quantities of each of the music pieces, for which the metadata label is to be estimated. For example, to estimate the j-th metadata label of Music k, the metadata label estimation unit 16 acquires from the music DB 11 feature quantities $X_{k1}$ to $X_{km}$ of Music k. FIG. 5 illustrates an example of the feature quantities $X_1$ to $X_m$ of Music 2 (i.e., feature quantities $X_{21}$ to $X_{2m}$) acquired from the music DB 11.

Further, the metadata label estimation unit 16 acquires from the metadata estimation formula DB 15 the parameters for calculating the estimated metadata label $M_j'$. That is, the metadata label estimation unit 16 acquires from the metadata estimation formula DB 15 the linear combination coefficients $b_{j0}$ and $b_{j1}$ to $b_{jm}$ for calculating the estimated metadata label $M_j'$ and the average $\mu_j$ and the dispersion $\sigma_j^2$ for identifying the estimation error distribution. Then, the metadata label estimation unit 16 calculates the estimated value (estimated metadata label) $M_{jk}'$ of the j-th metadata label of Music k on the basis of the above-described formula (3).

The metadata label estimation unit 16 can calculate the estimated metadata label $M_{jk}'$ for a predetermined number of music pieces or metadata types necessary for the search or recommendation processing. In other words, the metadata label estimation unit 16 can calculate the estimated metadata label $M_{jk}'$ for a necessary number of music pieces or metadata types in accordance with a request from the search unit 23 or the preference label estimation unit 21.

Subsequently, the processing of the preference estimation formula learning unit 19 will be described.

The preference estimation formula learning unit 19 acquires all of the preference labels stored in the preference label DB 18. Further, the preference estimation formula learning unit 19 acquires from the metadata label estimation unit 16 the estimated metadata labels $M_1''$ to $M_p''$ of each of the music pieces, the preference labels of which have been acquired from the preference label DB 18.

Herein, the j-th estimated metadata label $M_{jk}''$ of Music k acquired from the metadata label estimation unit 16 by the preference estimation formula learning unit 19 is calculated on the basis of the formula (4).

Formula 4

$$M_{jk}'' = \sum_{i=1}^{m} b_{ji} X_{ki} + b_{j0} \quad (4)$$

That is, the values of the estimated metadata labels $M_1''$ to $M_p''$ of the music pieces, which the preference estimation formula learning unit 19 acquires from the metadata label estimation unit 16 (causes the metadata label estimation unit 16 to calculate), do not include the estimation error according to the normal random number generation function.

FIG. 6 illustrates an example of the preference labels and the estimated metadata labels $M_1''$ to $M_p''$ of the music pieces acquired from the preference label DB 18 and the metadata label estimation unit 16, respectively.

The association between the preference label of each of the music pieces stored in the preference label DB 18 and the estimated metadata labels $M_1''$ to $M_p''$ acquired from the metadata label estimation unit 16 is recognizable on the basis of the title of the music piece, the registration order, the index number for identifying the music piece, or the like, similarly as in the case of the metadata estimation formula learning unit 14.

Then, the preference estimation formula learning unit 19 performs linear regression using the estimated metadata labels $M_1''$ to $M_p''$, to thereby derive a regression formula for estimating the preference label of each of the music pieces.

Specifically, when the linear combination coefficients are represented as $b_0$ and $b_1$ to $b_p$ and the error between a preference label Y already known as a true value and an estimated value Y' estimated by the regression formula in this case is represented as e, the preference label Y can be expressed by the following formula (5) using the estimated metadata labels $M_1''$ to $M_p''$.

Formula 5

$$Y = \sum_{i=1}^{P} b_i M_i'' + b_0 + e \quad (5)$$

Then, similarly as in the case of the metadata estimation formula learning unit 14, the preference estimation formula learning unit 19 creates, for each of the music pieces listed in FIG. 6, a formula by substituting the preference label Y and the estimated metadata labels $M_1''$ to $M_p''$ of the music piece in the formula (5), to thereby calculate the linear combination coefficients $b_0$ and $b_1$ to $b_p$ for minimizing the error e (square error $e^2$).

After the linear combination coefficients $b_0$ and $b_1$ to $b_p$ have been calculated, the calculated linear combination coefficients $b_0$ and $b_1$ to $b_p$ and the preference label Y and the estimated metadata labels $M_1''$ to $M_p''$ of each of the music pieces are substituted in the formula (5). Thereby, the error e can be obtained for the preference label Y of each of the music pieces. With the use of the actual error e in each of the music pieces as a sample, the preference estimation formula learning unit 19 models the estimation error generated in the use of the regression formula of the estimated preference label Y' by using a normal distribution (Gaussian distribution). The distribution of the estimation error of the estimated preference label Y' calculated here is assumed to have an average μ and a dispersion $\sigma^2$.

In accordance with the above description, the estimated preference label Y' representing the estimated value of the preference label of a music piece can be expressed by the following formula (6).

Formula 6

$$Y' = \sum_{i=1}^{P} b_i M_i'' + b_0 + NRN(\mu, \sigma^2) \quad (6)$$

Herein, $NRN(\mu, \sigma^2)$ represents a normal random number generation function with the average μ and the dispersion $\sigma^2$.

The formula (6) generalized for the k-th music piece (i.e., Music k) of the n number of music pieces can be expressed by the formula (7).

Formula 7

$$Y_k' = \sum_{i=1}^{P} b_i M_{ki}'' + b_0 + NRN(\mu, \sigma^2) \quad (7)$$

In the formula (7), $Y_k'$ represents the estimated preference label of Music k, and $M_{ki}''$ represents the i-th estimated metadata label of Music k.

The linear combination coefficients $b_0$ and $b_1$ to $b_p$ for calculating the estimated preference label of each of the music pieces and the average μ and the dispersion $\sigma^2$ of the normal distribution for identifying the estimation error distribution, which have been calculated by the preference estimation formula learning unit 19 as described above, are supplied to and stored in the preference estimation formula DB 20, as the parameters for calculating the estimated preference label Y'.

Subsequently, the processing of the preference label estimation unit 21 will be described.

The preference label estimation unit 21 acquires from the metadata label estimation unit 16 the estimated metadata labels $M_1''$ to $M_p''$ of each of the music pieces, for which the preference label is to be estimated. For example, to estimate the preference label of Music k, the preference label estimation unit 21 acquires from the metadata label estimation unit 16 the estimated metadata labels $M_{k1}''$ to $M_{kp}''$. FIG. 7 illustrates an example of the estimated metadata labels $M_1''$ to $M_p''$ of Music 2 (i.e., estimated metadata labels $M_{21}''$ to $M_{2p}''$) acquired from the metadata label estimation unit 16.

Further, the preference label estimation unit 21 acquires from the preference estimation formula DB 20 the parameters for calculating the estimated preference label Y'. That is, the preference label estimation unit 21 acquires from the preference estimation formula DB 20 the linear combination coefficients $b_0$ and $b_1$ to $b_p$ for calculating the estimated preference label of each of the music pieces and the average μ and the dispersion $\sigma^2$ of the normal distribution for identifying the estimation error distribution. Then, the preference label estimation unit 21 calculates the estimated preference label $Y_k'$ of Music k on the basis of the above-described formula (7).

The preference label estimation unit 21 can calculate the estimated preference label $Y_k'$ for a predetermined number of music pieces necessary for the search or recommendation processing. In other words, the preference label estimation unit 21 can calculate the estimated preference label $Y_k'$ for a necessary number of music pieces in accordance with a request from the search unit 23 or the recommendation unit 24.

Subsequently, description will be made of the search and the recommendation using the estimated metadata label $M_{jk}'$ and the estimated preference label $Y_k'$ calculated as described above.

Description will be first made of an example in which the search or recommendation request input unit 22 receives a search request from a user for "cheerful" music pieces.

The search unit 23 acquires from the metadata label estimation unit 16 estimated metadata labels $M_{j1}'$ to $M_{jn}'$ of the metadata "cheerfulness" (j herein represents a value corresponding to the metadata "cheerfulness") for Music 1 to Music n, and acquires from the preference label estimation unit 21 estimated preference labels $Y_1'$ to $Y_n'$ of the music pieces.

FIG. 8 illustrates an example of data of the estimated metadata labels $M_{j1}'$ to $M_{jn}'$ of the metadata "cheerfulness" and the estimated preference labels $Y_1'$ to $Y_n'$ of Music 1 to Music n.

The search unit 23 sorts Music 1 to Music n in descending order of the estimated metadata label or the estimated preference label, and supplies the search or recommendation result presentation unit 25 with a music list obtained after the sorting, as the search result.

Figure 9:
FIG. 9 is a diagram illustrating a result of sorting of music pieces performed in search processing in descending order of the estimated metadata labels.

FIG. 9 illustrates the result of sorting performed in descending order of the estimated metadata label, i.e., the estimated metadata labels $M_{j1}'$ to $M_{jn}'$ of the metadata "cheerfulness."

Further, for example, there is a case in which the metadata label is specified in a range as the search condition. In such a case, the search unit 23 can supply the search or recommendation result presentation unit 25 with a music list of music pieces, the estimated metadata label of which falls within the specified range, and which are sorted in descending order of the estimated preference label, as the search result.

Figure 10:
FIG. 10 is a diagram illustrating a result of sorting of music pieces performed in search processing in descending order of the estimated preference labels.

FIG. 10 illustrates an example of the search result obtained when the user inputs a condition that the metadata label of the metadata "cheerfulness" is "three or less."

In FIG. 10, only the music pieces in which the estimated metadata label of the metadata "cheerfulness" is three or less are extracted, and the extracted music pieces are further sorted in descending order of the estimated preference label.

Subsequently, description will be made of an example in which a recommendation request is supplied from the search or recommendation request input unit 22.

The recommendation unit 24 acquires from the preference label estimation unit 21 the estimated preference labels $Y_1'$ to $Y_n'$ of Music 1 to Music n.

FIG. 11 illustrates an example of data of the acquired estimated preference labels $Y_1'$ to $Y_n'$.

Figure 12:
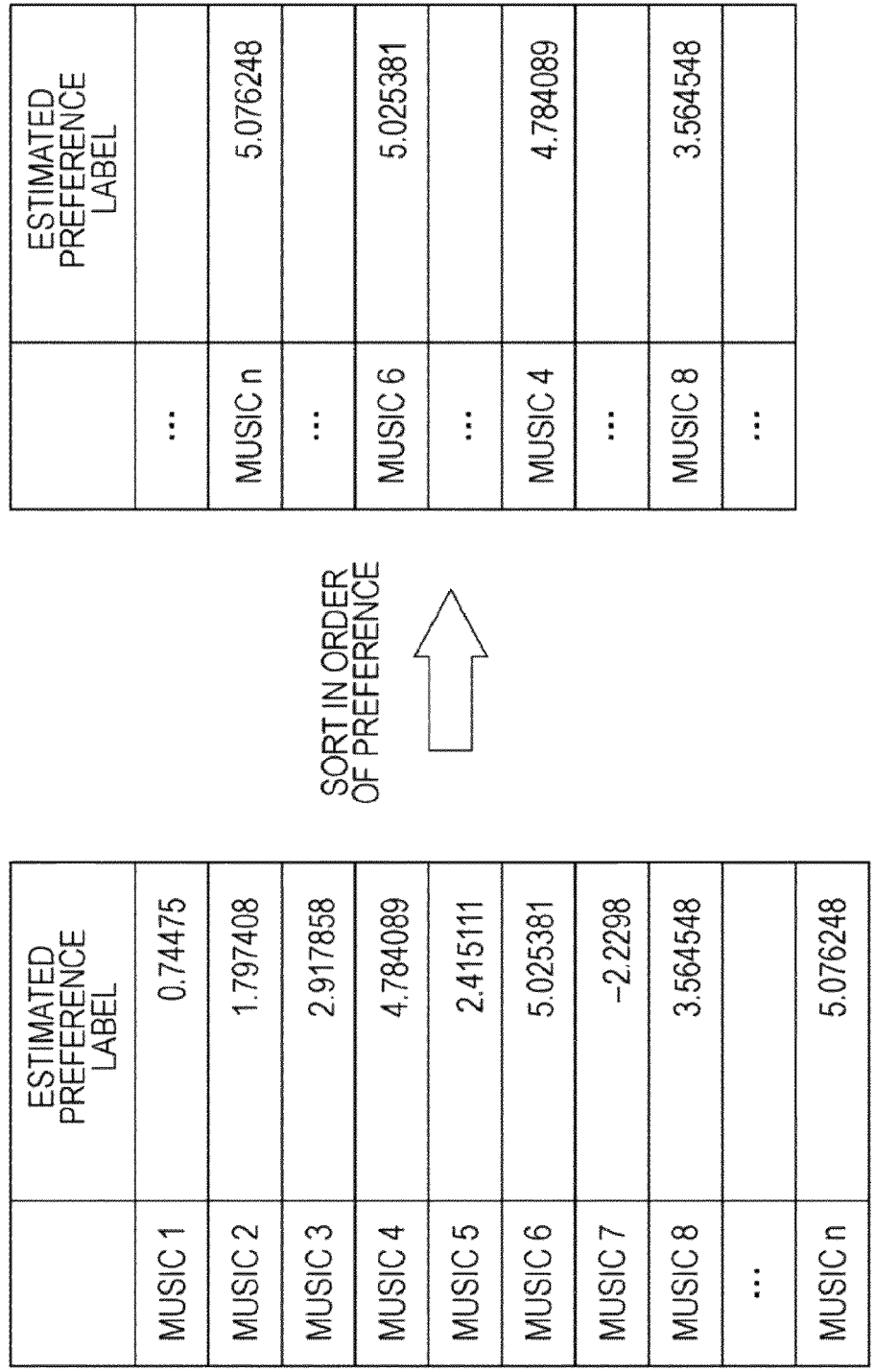
FIG. 12 is a diagram illustrating a result of sorting performed in recommendation processing in descending order of the estimated preference labels.

Then, as illustrated in FIG. 12, the recommendation unit 24 sorts Music 1 to Music n in descending order of the estimated preference label, and supplies the search or recommendation result presentation unit 25 with a music list obtained after the sorting, as the recommendation result.

Subsequently, with reference to the flowcharts of FIGS. 13 to 19, description will be further made of the processing performed by the metadata estimation formula learning unit 14, the metadata label estimation unit 16, the preference estimation formula learning unit 19, the preference label estimation unit 21, the search unit 23, the recommendation unit 24, and the search or recommendation result presentation unit 25, respectively.

It is assumed that necessary data is stored in each of the music DB 11, the metadata label DB 13, and the preference label DB 18 prior to the processing described below.

Figure 13:
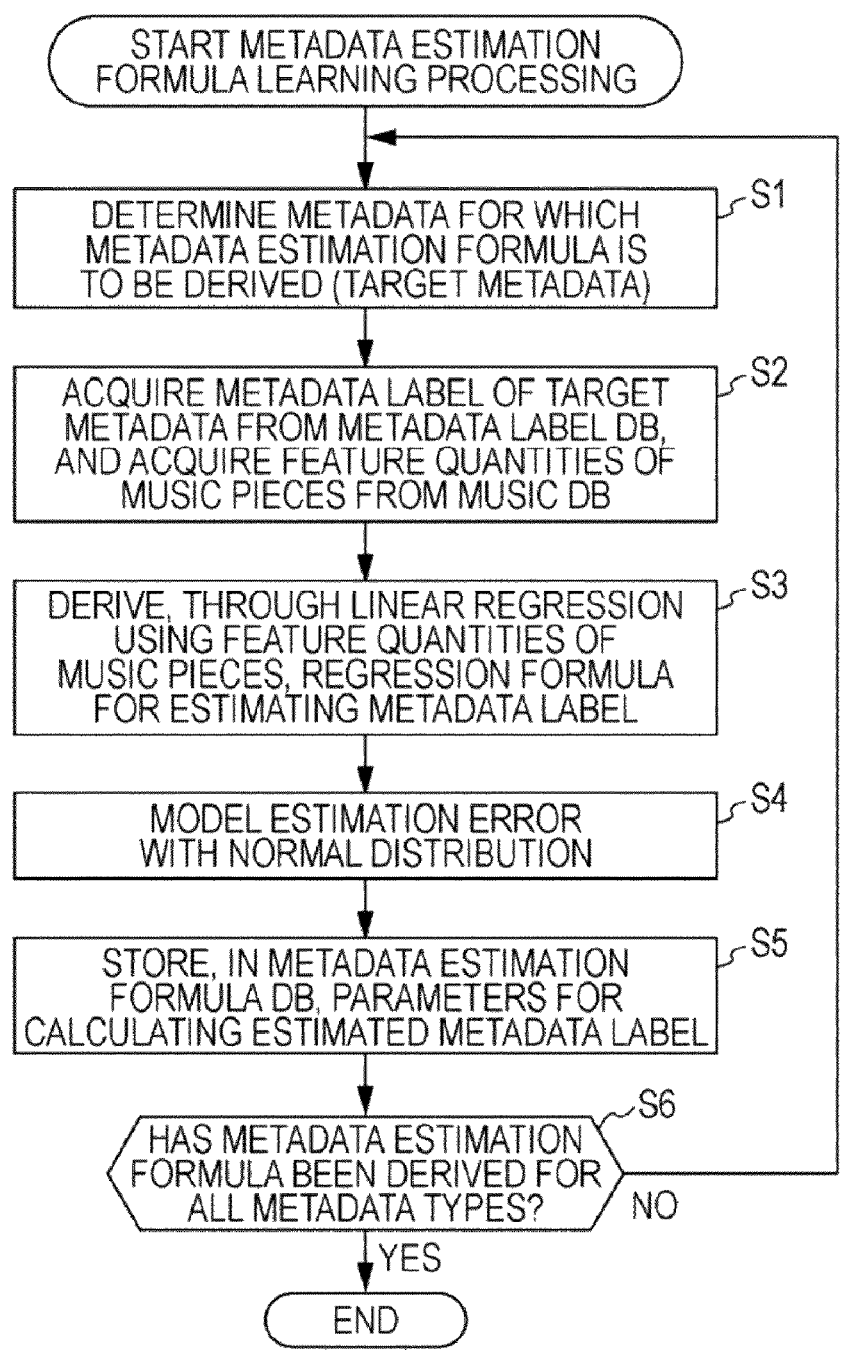
FIG. 13 is a flowchart for explaining metadata estimation formula learning processing.

FIG. 13 shows a flowchart of metadata estimation formula learning processing performed by the metadata estimation formula learning unit 14.

Firstly, at Step S1, the metadata estimation formula learning unit 14 determines the metadata for which the metadata estimation formula is to be derived (hereinafter referred to as the target metadata). That is, the metadata estimation formula learning unit 14 determines the target metadata to be one of the metadata types, for which the metadata estimation formula has not been derived.

At Step S2, the metadata estimation formula learning unit 14 acquires from the metadata label DB 13 the metadata label $M_j$ of the target metadata. Further, the metadata estimation formula learning unit 14 acquires from the music DB 11 the feature quantities $X_1$ to $X_m$ of the music pieces. The feature quantities $X_1$ to $X_m$ acquired here are of the music pieces, the metadata label $M_j$ of which has been acquired. Then, the metadata estimation formula learning unit 14 stores the metadata label $M_j$ and the feature quantities $X_1$ to $X_m$ of each of the acquired music pieces such that the metadata label $M_j$ and the feature quantities $X_1$ to $X_m$ are associated with each other.

At Step S3, the metadata estimation formula learning unit 14 performs linear regression using the feature quantities $X_1$ to $X_m$ of each of the music pieces, to thereby derive a regression formula for estimating the metadata label $M_j'$ of the target metadata. That is, the metadata estimation formula learning unit 14 creates a formula by substituting the metadata label $M_j$ and the feature quantities $X_1$ to $X_m$ of each of the music pieces in the formula (1). Then, on the basis of the created formula, the metadata estimation formula learning unit 14 calculates the linear combination coefficients $b_{j0}$ and $b_{j1}$ to $b_{jm}$ for minimizing the error $e_j$ (square error $e_j^2$).

At Step S4, the metadata estimation formula learning unit 14 models the estimation error generated in the use of the regression formula of the estimated metadata label $M_j'$ by using a normal distribution (Gaussian distribution). That is, the metadata estimation formula learning unit 14 calculates the average $\mu_j$ and the dispersion $\sigma_j^2$ of the normal distribution by using, as a sample, the actual error $e_j$ in each of the music pieces, which is obtained by substituting in the formula (1) the calculated linear combination coefficients $b_{j0}$ and $b_{j1}$ to $b_{jm}$ and the metadata label $M_j$ and the feature quantities $X_1$ to $X_m$ of each of the music pieces assigned with the metadata label of the target metadata.

At Step S5, the metadata estimation formula learning unit 14 supplies the parameters for calculating the estimated metadata label $M_j'$ to the metadata estimation formula DB 15 to have the parameters stored therein. That is, the metadata estimation formula learning unit 14 supplies the metadata estimation formula DB 15 with the linear combination coefficients $b_{j0}$ and $b_{j1}$ to $b_{jm}$ of the metadata estimation formula for calculating the estimated metadata label $M_j'$ and the average $\mu_j$ and the dispersion $\sigma_j^2$ of the normal distribution for identifying the distribution of the estimation error, to have the linear combination coefficients $b_{j0}$ and $b_{j1}$ to $b_{jm}$, the average $\mu_j$, and the dispersion $\sigma_j^2$ stored therein.

At Step S6, the metadata estimation formula learning unit 14 determines whether or not the metadata estimation formula has been derived for all of the metadata types. If it is determined at Step S6 that the metadata estimation formula has not been derived for all of the metadata types, the processing returns to Step S1 to determine the target metadata to be another metadata type, for which the metadata estimation formula has not been derived. Then, the processes of Step S2 to S6 are performed.

Meanwhile, if it is determined at Step S6 that the metadata estimation formula has been derived for all of the metadata types, the processing is completed.

Figure 14:
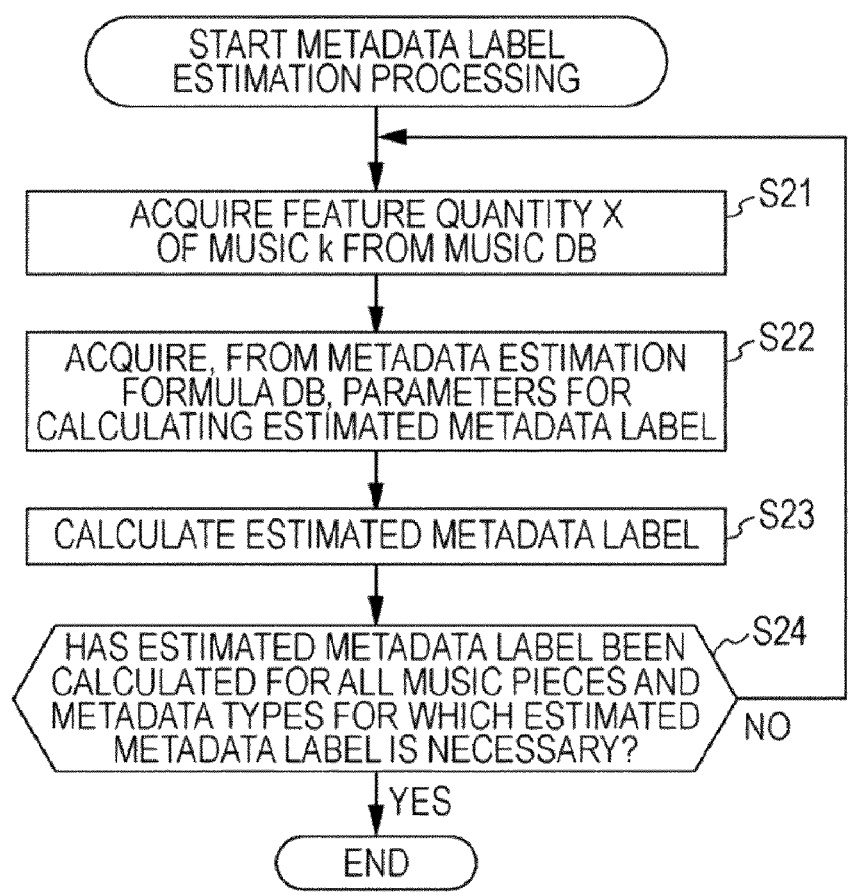
FIG. 14 is a flowchart for explaining metadata label estimation processing.

Subsequently, with reference to the flowchart of FIG. 14, description will be made of metadata label estimation processing performed to estimate a predetermined metadata label of Music k.

Firstly, at Step S21, the metadata label estimation unit 16 acquires from the music DB 11 the feature quantities $X_{k1}$ to $X_{km}$ of Music k.

At Step S22, the metadata label estimation unit 16 acquires from the metadata estimation formula DB 15 the parameters for calculating the estimated metadata label. For example, to calculate the j-th metadata label of Music k (estimated metadata label $M_{jk}'$), the metadata label estimation unit 16 acquires from the metadata estimation formula DB 15 the linear combination coefficients $b_{j0}$ and $b_{j1}$ to $b_{jm}$ of the metadata estimation formula and the average $\mu_j$ and the dispersion $\sigma_j^2$ of the normal distribution for identifying the estimation error distribution.

At Step S23, the metadata label estimation unit 16 calculates the estimated metadata label. For example, to calculate the estimated value of the j-th metadata label of Music k, the metadata label estimation unit 16 calculates the estimated value $M_{jk}'$ of the metadata label on the basis of the formula (3).

At Step S24, the metadata label estimation unit 16 determines whether or not the estimated metadata label has been calculated for all music pieces and metadata types, for which the estimated metadata label is necessary.

If it is determined at Step S24 that the estimated metadata label has not been calculated for all music pieces and metadata types, for which the estimated metadata label is necessary, the processing returns to Step S21 to perform the processes at the step and the subsequent steps. That is, the processing of calculating the estimated metadata label for the next metadata type or music piece is performed.

Meanwhile, if it is determined at Step S24 that the estimated metadata label has been calculated for all music pieces and metadata types, for which the estimated metadata label is necessary, the processing is completed.

Figure 15:
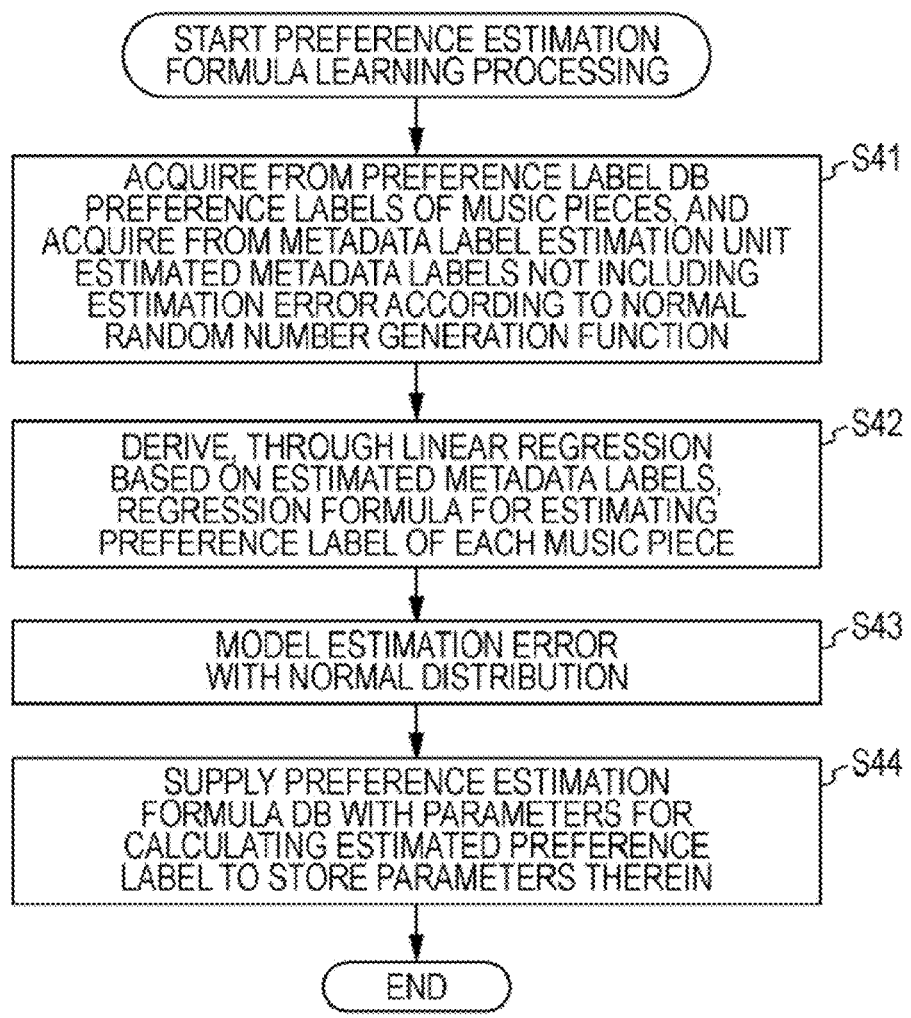
FIG. 15 is a flowchart for explaining preference estimation formula learning processing.

Subsequently, with reference to the flowchart of FIG. 15, preference estimation formula learning processing by the preference estimation formula learning unit 19 will be described.

At Step S41, the preference estimation formula learning unit 19 acquires from the preference label DB 18 the preference labels of all music pieces stored in the preference label DB 18. Further, at Step S41, the preference estimation formula learning unit 19 acquires from the metadata label estimation unit 16 the estimated metadata labels $M_1''$ to $M_p''$ of each of the music pieces, the preference labels of which have been acquired from the preference label DB 18, i.e., the estimated metadata labels $M_1"$ to $M_p"$ not including the estimation error according to the normal random number generation function.

At Step S42, the preference estimation formula learning unit 19 performs linear regression on the basis of the estimated metadata labels $M_1"$ to $M_p"$, to thereby derive a regression formula for estimating the preference label of each of the music pieces. That is, the preference estimation formula learning unit 19 creates a formula by substituting the preference label Y and the estimated metadata labels $M_1"$ to $M_p"$ of each of the music pieces in the formula (5). Then, on the basis of the created formula, the preference estimation formula learning unit 19 calculates the linear combination coefficients $b_0$ and $b_1$ to $b_p$ for minimizing the error e (square error $e^2$).

At Step S43, the preference estimation formula learning unit 19 models the estimation error generated in the use of the regression formula of the estimated preference label Y' by using a normal distribution (Gaussian distribution). That is, the preference estimation formula learning unit 19 calculates the average μ and the dispersion $\sigma^2$ of the normal distribution by using, as a sample, the actual error e in each of the music pieces, which is obtained by substituting the calculated linear combination coefficients $b_0$ and $b_1$ to $b_p$ and the preference label Y and the estimated metadata labels $M_1"$ to $M_p"$ of each of the music pieces in the formula (5).

At Step S44, the preference estimation formula learning unit 19 supplies the preference estimation formula DB 20 with the parameters for calculating the estimated preference label Y' to have the parameters stored therein, and the processing is completed. That is, the preference estimation formula learning unit 19 supplies the preference estimation formula DB 20 with the linear combination coefficients $b_0$ and $b_1$ to $b_p$ for calculating the estimated preference label of the music pieces and the average μ and the dispersion $\sigma^2$ of the normal distribution for identifying the distribution of the estimation error, to have the linear combination coefficients $b_0$ and $b_1$ to $b_p$, the average μ, and the dispersion $\sigma^2$ stored therein, and the processing is completed.

Figure 16:
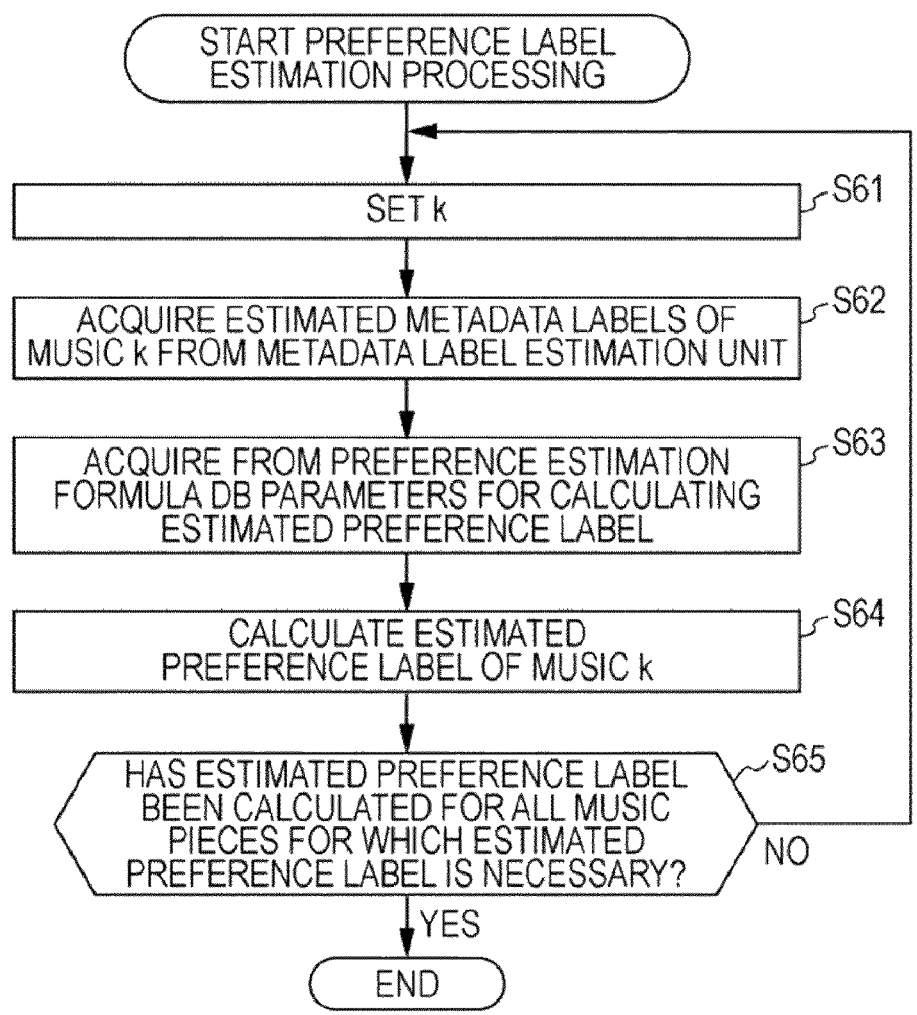
FIG. 16 is a flowchart for explaining preference label estimation processing.

Subsequently, with reference to the flowchart of FIG. 16, preference label estimation processing by the preference label estimation unit 21 will be described.

Firstly, at Step S61, the preference label estimation unit 21 sets a variable k for identifying a music piece for which the preference label is to be estimated.

At Step S62, the preference label estimation unit 21 acquires from the metadata label estimation unit 16 the estimated metadata labels $M_{k1}"$ to $M_{kp}"$ of Music k.

At Step S63, the preference label estimation unit 21 acquires from the preference estimation formula DB 20 the parameters for calculating the estimated preference label $Y_k'$ of Music k. Specifically, the preference label estimation unit 21 acquires from the preference estimation formula DB 20 the linear combination coefficients $b_0$ and $b_1$ to $b_p$ of the preference estimation formula and the average μ and the dispersion $\sigma^2$ of the normal distribution for identifying the estimation error.

At Step S64, the preference label estimation unit 21 calculates the estimated preference label $Y_k'$ of Music k on the basis of the above-described formula (7).

At Step S65, the preference label estimation unit 21 determines whether or not the estimated preference label has been calculated for all music pieces for which the estimated preference label is necessary.

If it is determined at Step S65 that the estimated preference label has not been calculated for all music pieces for which the estimated preference label is necessary, the processing returns to Step S61 to perform the processes at the step and the subsequent steps. That is, the processing of calculating the estimated preference label of the next music piece is performed.

Meanwhile, if it is determined at Step S65 that the estimated preference label has been calculated for all music pieces for which the estimated preference label is necessary, the processing is completed.

Subsequently, with reference to the flowchart of FIG. 17, description will be made of search or recommendation request reception processing of receiving a music search or recommendation request from a user and causing the search unit 23 or the recommendation unit 24 to perform the search processing or the recommendation processing.

Firstly, at Step S81, the search or recommendation request input unit 22 receives a music search or recommendation request from a user.

At Step S82, the search or recommendation request input unit 22 determines whether the user-input request is a search request or a recommendation request.

If it is determined at Step S82 that the user-input request is the search request, the processing proceeds to Step S83. Then, the search or recommendation request input unit 22 outputs the search request to the search unit 23 together with a user-input search condition, and the processing is completed.

Meanwhile, if it is determined at Step S82 that the user-input request is the recommendation request, the processing proceeds to Step S84. Then, the search or recommendation request input unit 22 outputs the recommendation request to the recommendation unit 24, and the processing is completed.

Figure 17:
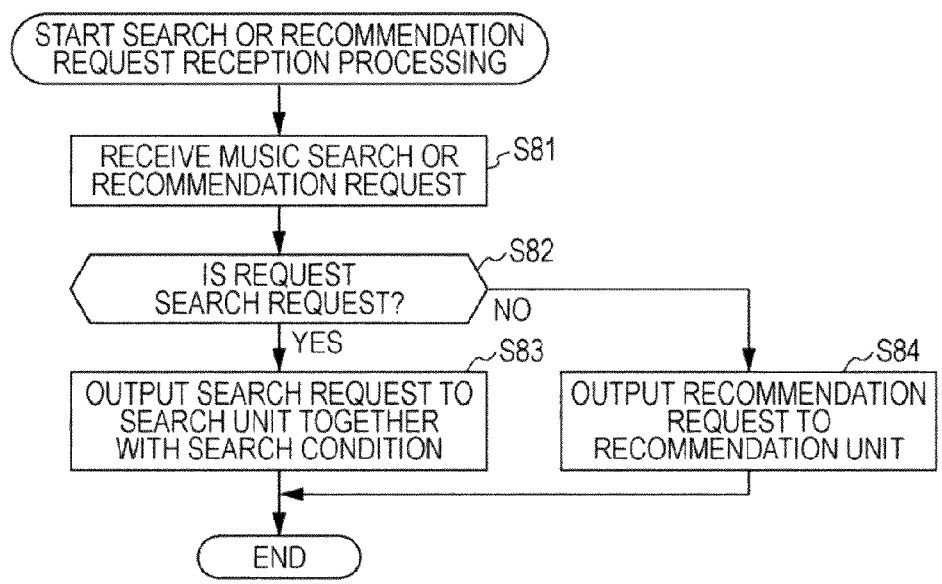
FIG. 17 is a flowchart for explaining search or recommendation request reception processing.
Figure 18:
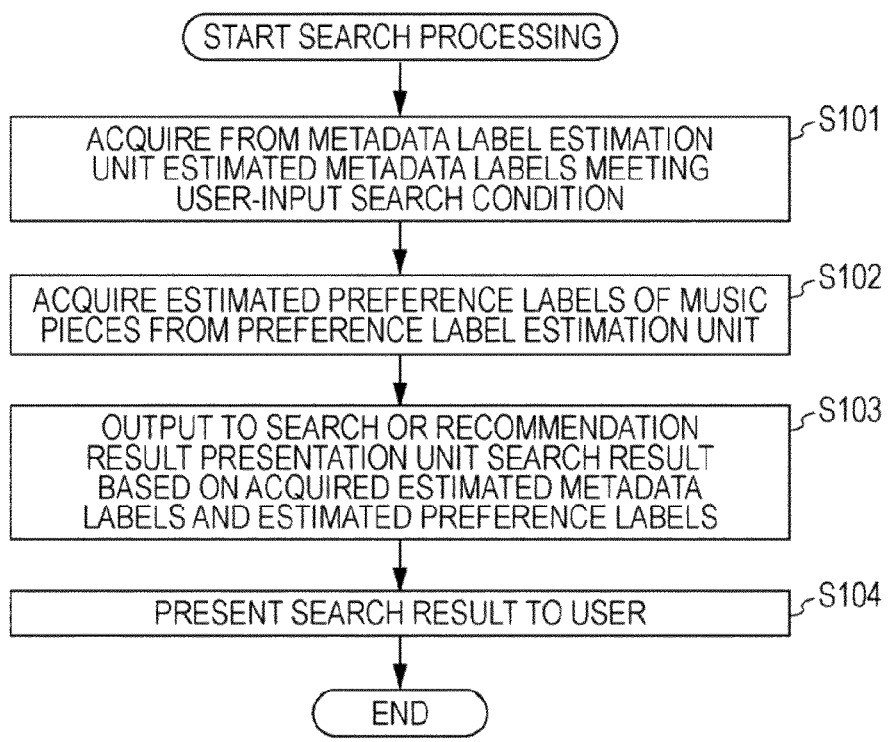
FIG. 18 is a flowchart for explaining search processing.

FIG. 18 shows a flowchart of the search processing performed in accordance with the search request output at Step S83 of FIG. 17 described above.

Upon supply of the search request and the user-input search condition to the search unit 23 from the search or recommendation request input unit 22, the search unit 23 at Step S101 acquires from the metadata label estimation unit 16 the estimated metadata label of each of the music pieces stored in the music DB 11 and meeting the user-input search condition. For example, if the user-input search condition is "cheerful" music pieces, the estimated metadata label of the metadata "cheerfulness" is acquired from the metadata label estimation unit 16.

At Step S102, the search unit 23 acquires from the preference label estimation unit 21 the estimated preference labels of all of the music pieces stored in the music DB 11.

At Step S103, the search unit 23 outputs to the search or recommendation result presentation unit 25 the search result based on the acquired estimated metadata labels and estimated preference labels. That is, the search unit 23 sorts Music 1 to Music n in descending order of the estimated metadata labels or the estimated preference labels, and supplies the search or recommendation result presentation unit 25 with a music list obtained after the sorting, as the search result.

At Step S104, the search or recommendation result presentation unit 25 presents to the user the search result supplied by the search unit 23. For example, the search or recommendation result presentation unit 25 displays, on a screen, the music list as the search result, or reproduces the music pieces in the order of the music list as the search result. Upon completion of the presentation of the search result to the user, the search processing is completed.

Figure 19:
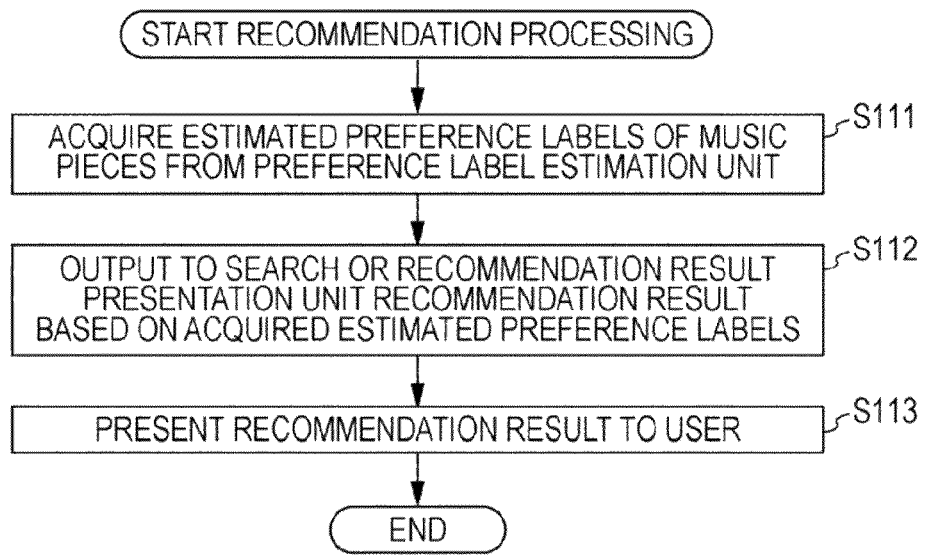
FIG. 19 is a flowchart for explaining recommendation processing.

FIG. 19 shows a flowchart of the recommendation processing performed in accordance with the recommendation request output at Step S84 of FIG. 17 described above.

Upon supply of the user-input recommendation request to the recommendation unit 24 from the search or recommendation request input unit 22, the recommendation unit 24 at Step S111 acquires from the preference label estimation unit 21 the estimated preference labels of all of the music pieces stored in the music DB 11.

At Step S112, the recommendation unit 24 outputs to the search or recommendation result presentation unit 25 the recommendation result based on the acquired estimated preference labels. That is, the recommendation unit 24 supplies the search or recommendation result presentation unit 25 with a list of music pieces sorted in descending order of the estimated preference labels, as the recommendation result.

At Step S113, the search or recommendation result presentation unit 25 presents to the user the recommendation result supplied by the recommendation unit 24. For example, the search or recommendation result presentation unit 25 displays, on a screen, the music list as the recommendation result, or reproduces the music pieces in the order of the music list as the recommendation result. Upon completion of the presentation of the recommendation result to the user, the recommendation processing is completed.

As described above, the search unit 23 outputs the search result on the basis of the estimated metadata labels estimated by the metadata label estimation unit 16 and the estimated preference labels estimated by the preference label estimation unit 21. Further, the recommendation unit 24 outputs the recommendation result on the basis of the estimated preference labels estimated by the preference label estimation unit 21.

The estimated metadata labels estimated by the metadata label estimation unit 16 and the estimated preference labels estimated by the preference label estimation unit 21 include the normal random number generation function. Therefore, even if there is no change in the metadata labels of the music pieces stored in the metadata label DB 13 and the preference labels of the music pieces stored in the preference label DB 18, the search result and the recommendation result presented to the user are different each time. Accordingly, it is possible to prevent the user from getting bored with the presented content.

The average and the dispersion of the normal random number generation function are based on the modeling of the actual error with the regression formula, and have grounded randomness. That is, it is possible to provide the search or recommendation result with appropriate randomness according to actual data.

When the preference estimation formula learning unit 19 derives the preference estimation formula, the preference estimation formula learning unit 19 acquires the values of the estimated metadata labels $M_1"$ to $M_p"$, which do not include the estimation error according to the normal random number generation function. Therefore, the accurate preference estimation formula can be derived.

Figure 20:
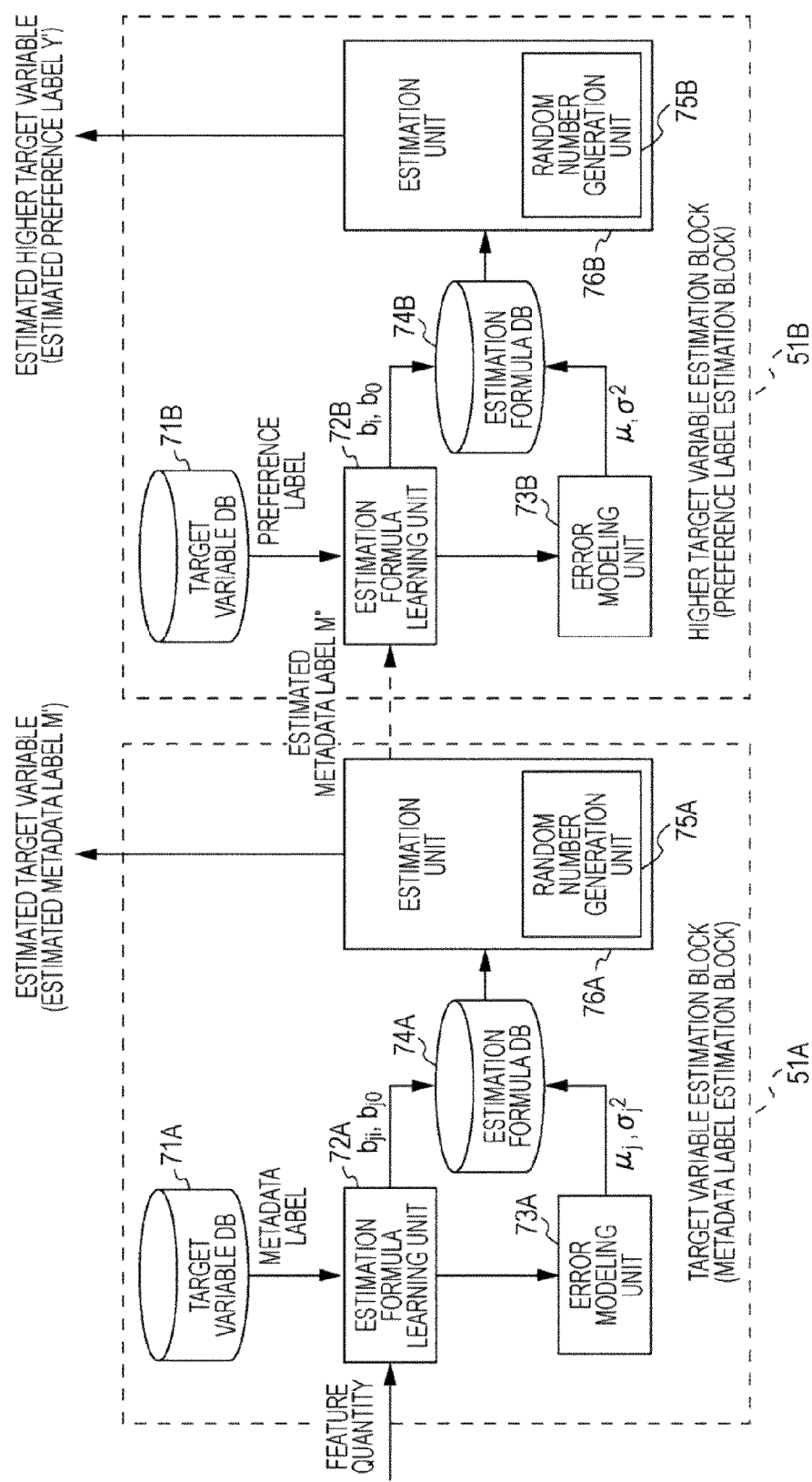
FIG. 20 is a functional block diagram illustrating an estimation function.

FIG. 20 is a functional block diagram summarizing the estimation function of the information processing device 1.

The estimation function of the information processing device 1 can be divided into a target variable estimation block 51A and a higher target variable estimation block 51B.

The target variable estimation block 51A and the higher target variable estimation block 51B have the same configuration including a target variable DB 71, an estimation formula learning unit 72, an error modeling unit 73, an estimation formula DB 74, and an estimation unit 76 including a random number generation unit 75. That is, the target variable estimation block 51A includes a target variable DB 71A, an estimation formula learning unit 72A, an error modeling unit 73A, an estimation formula DB 74A, a random number generation unit 75A, and an estimation unit 76A. Meanwhile, the higher target variable estimation block 51B includes a target variable DB 71B, an estimation formula learning unit 72B, an error modeling unit 73B, an estimation formula DB 74B, a random number generation unit 75B, and an estimation unit 76B.

The target variable estimation block 51A estimates a predetermined target variable (first target variable). The higher target variable estimation block 51B estimates a target variable higher than the first target variable (second target variable) by using the target variable estimated by the target variable estimation block 51A. In the above-described example, the target variable estimated by the target variable estimation block 51A is the metadata label of a music piece, and the target variable estimated by the higher target variable estimation block 51B is the preference label of a music piece.

Therefore, the target variable DB 71A corresponds to the metadata label DB 13, and the estimation formula learning unit 72A and the error modeling unit 73A correspond to the metadata estimation formula learning unit 14. Further, the estimation formula DB 74A corresponds to the metadata estimation formula DB 15, and the random number generation unit 75A and the estimation unit 76A correspond to the metadata label estimation unit 16.

Further, the target variable DB 71B corresponds to the preference label DB 18, and the estimation formula learning unit 72B and the error modeling unit 73B correspond to the preference estimation formula learning unit 19. Further, the estimation formula DB 74B corresponds to the preference estimation formula DB 20, and the random number generation unit 75B and the estimation unit 76B correspond to the preference label estimation unit 21.

In the estimation of the metadata label used in the search processing, the estimation unit 76A of the target variable estimation block 51A outputs the estimated metadata label $M_j'$ including the random number generated by the random number generation unit 75A in accordance with the average $\mu_j$ and the dispersion $\sigma_j^2$ of the normal distribution stored in the estimation formula DB 74A. Meanwhile, as the estimated metadata label used by the higher target variable estimation block 51B to derive the estimation formula, the estimated metadata label $M_j"$ not including the random number according to the average $\mu_j$ and the dispersion $\sigma_j^2$ of the normal distribution is output.

Accordingly, when the estimation formula learning unit 72B of the higher target variable estimation block 51B derives the estimation formula, more accurate linear combination coefficients $b_0$ and $b_1$ to $b_p$ can be calculated. Meanwhile, in the estimation of the preference label used in the search processing and the recommendation processing by the estimation unit 76B of the higher target variable estimation block 51B, the estimated preference label including the random number generated by the random number generation unit 75B in accordance with the average $\mu$ and the dispersion $\sigma^2$ of the normal distribution stored in the estimation formula DB 74B is output.

As described above, in the presentation of the search result and the recommendation result, the information processing device 1 can output the estimation result provided with appropriate randomness, and also can derive the accurate estimation formula.

The series of processing described above can be performed both by hardware and software. To have the series of processing performed by software, a program forming the software is installed from a program recording medium on a computer incorporated in special hardware or a general-purpose personal computer, for example, which can perform a variety of functions by installing a variety of programs thereon.

Figure 21:
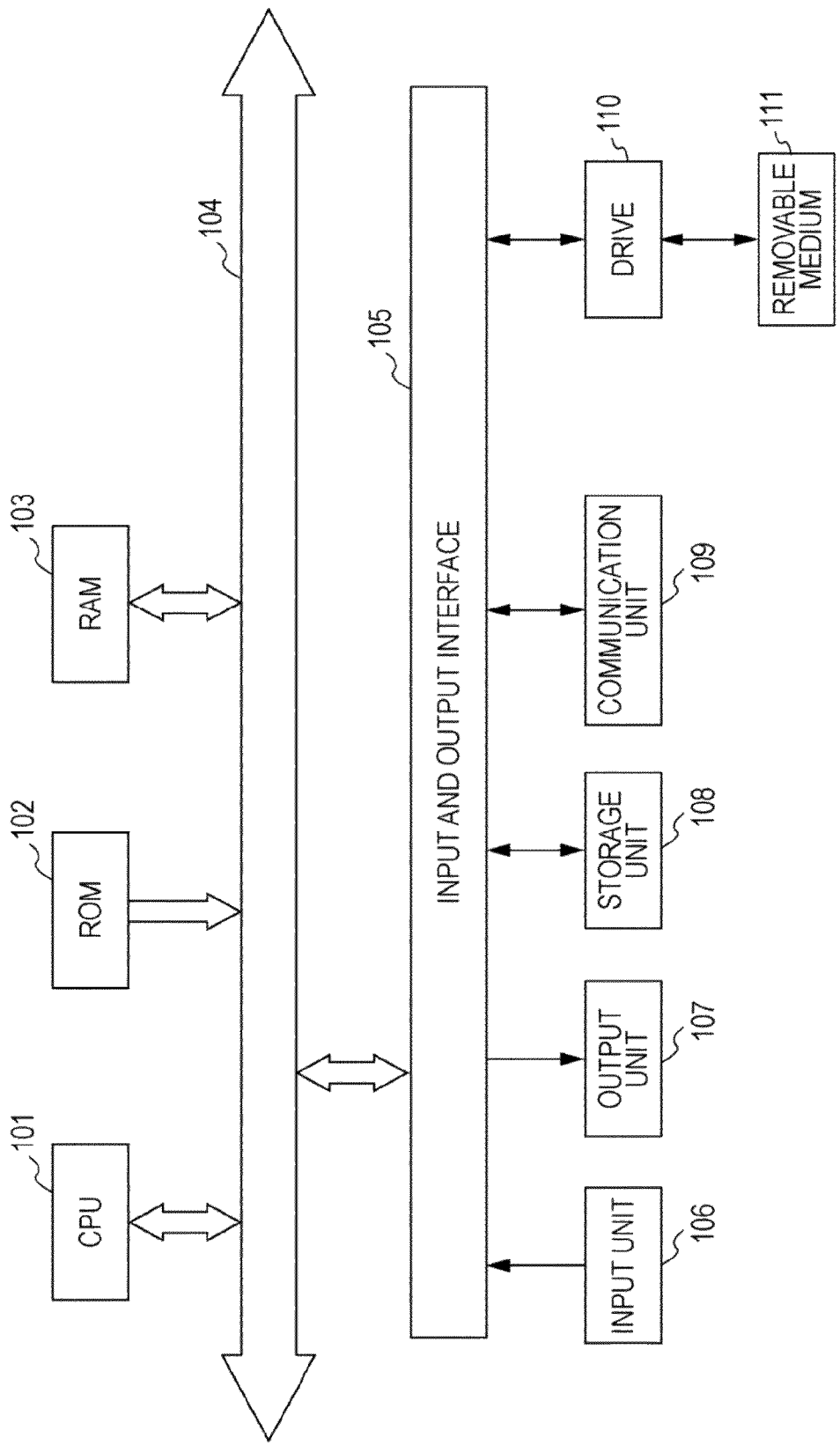
FIG. 21 is a block diagram illustrating a configuration example of a computer to which an embodiment of the present invention is applied.

FIG. 21 is a block diagram illustrating a configuration example of the hardware of a computer which performs the above-described series of processing on the basis of a program.

In the computer, a CPU (Central Processing Unit) 101, a ROM (Read-Only Memory) 102, and a RAM (Random Access Memory) 103 are mutually connected by a bus 104.

The bus 104 is further connected to an input and output interface 105. The input and output interface 105 is connected to an input unit 106 formed by a keyboard, a mouse, a microphone, and so forth, an output unit 107 formed by a display, a speaker, and so forth, a storage unit 108 formed by a hard disk, a nonvolatile memory, and so forth, a communication unit 109 formed by a network interface, and so forth, and a drive 110 for driving a removable medium 111 such as a magnetic disc, an optical disc, a magneto-optical disc, and a semiconductor memory.

For example, the metadata label input unit 12, the preference label input unit 17, and the search or recommendation request input unit 22 correspond to the input unit 106 and the output unit 107. Further, the music DB 11, the metadata label DB 13, the metadata estimation formula DB 15, the preference label DB 18, and the preference estimation formula DB 20 correspond to the RAM 103 or the storage unit 108, and the search or recommendation result presentation unit 25 corresponds to the output unit 107. Further, the metadata estimation formula learning unit 14, the metadata label estimation unit 16, the preference estimation formula learning unit 19, the preference label estimation unit 21, the search unit 23, and the recommendation unit 24 correspond to the CPU 101 and the RAM 103.

In the computer configured as described above, the CPU 101 loads the program stored in the storage unit 108, for example, into the RAM 103 via the input and output interface 105 and the bus 104, and executes the program. Thereby, the above-described series of processing is performed.

The program executed by the computer (CPU 101) is provided as recorded on the removal medium 111, which is a packaged medium such as a magnetic disc (including a flexible disc), an optical disc (e.g., a CD-ROM or Compact Disc-Read Only Memory and a DVD or Digital Versatile Disc), a magneto-optical disc, and a semiconductor memory, for example. Alternatively, the program is provided via a wired or wireless transmission medium such as a local area network, the Internet, and digital satellite broadcasting.

The program executed by the computer may be a program chronologically executed in the order described in the present specification, or a program executed concurrently or at necessary timing such as upon invocation of the program.

In the present specification, the steps described in each of the flowcharts include not only processes performed chronologically in the described order but also processes not necessarily performed chronologically but performed concurrently or individually.

The respective processes in FIGS. 13 to 19 may be performed as a sequence of processing in accordance with the music search or recommendation request input by the user, or may be performed independently at predetermined timing, such as upon update of the data in the DBs including the music DB 11, the metadata label DB 13, and the preference label DB 18 and after the lapse of a predetermined time. That is, the timing at which each of the processes is performed is not particularly limited to predetermined timing.

The embodiments of the present invention are not limited to the embodiments described above. Thus, the present invention can be modified in a variety of ways within the scope not departing from the gist of the present invention.

The present application contains subject matter related to that disclosed in Japanese Priority Patent Application JP filed in the Japan Patent Office on Jul. 8, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing device comprising:
   first learning means for learning a first metadata estimation formula for estimating a first target variable of content on the basis of the feature quantity of the content;
   first error modeling means for determining a first model of an error generated in the estimation of the first target variable based on the first metadata estimation formula learned by the first learning means;
   first error generation means for generating, with the use of a random number, an error according to the first model determined by the first error modeling means; and
   first estimation means for estimating the first target variable of the content by using the first metadata estimation formula learned by the first learning means and the random number generated by the first error generation means.

2. The information processing device according to claim 1, wherein the first model is obtained by modeling of the distribution of the error generated in the estimation of the first target variable with a normal distribution.

3. The information processing device according to claim 2, further comprising:
   search means for searching for content by using the first target variable of the content estimated by the first estimation means.

4. The information processing device according to claim 3, wherein, every time the search means searches for content, the first estimation means estimates the first target variable of the content.

5. The information processing device according to claim 2, further comprising:
   second learning means for learning a second metadata estimation formula for estimating a second target variable, by using the first target variable obtained solely by the use of the first metadata estimation formula learned by the first learning means;
   second error modeling means for determining a second model of an error generated in the estimation of the second target variable based on the second metadata estimation formula learned by the second learning means;
   second error generation means for generating, with the use of a random number, an error according to the second model determined by the second error modeling means; and
   second estimation means for estimating the second target variable of the content by using the second metadata estimation formula learned by the second learning means and the random number generated by the second error generation means.

6. The information processing device according to claim 5, further comprising:
   recommendation means for recommending content by using the second target variable of the content estimated by the second estimation means.

7. An information processing method comprising the steps of:
- learning a first metadata estimation formula for estimating a first target variable of content on the basis of the feature quantity of the content;
- determining a first model of an error generated in the estimation of the first target variable based on the learned first estimation formula;
- generating, with the use of a random number, an error according to the determined first model; and
- estimating the first target variable of the content by using the learned first estimation formula and the generated random number.

8. A non-transitory computer-readable storage medium with an executable program stored thereon, wherein the program instructs a microprocessor to perform the steps of:
- learning a first metadata estimation formula for estimating a first target variable of content on the basis of the feature quantity of the content;
- determining a first model of an error generated in the estimation of the first target variable based on the learned first metadata estimation formula;
- generating, with the use of a random number, an error according to the determined first model; and
- estimating the first target variable of the content by using the-learned first metadata estimation formula and the generated random number.

9. An information processing device comprising:
- a first learning unit configured to learn a first metadata estimation formula for estimating a first target variable of content on the basis of the feature quantity of the content;
- a first error modeling unit configured to determine a first model of an error generated in the estimation of the first target variable based on the first metadata estimation formula learned by the first learning unit;
- a first error generation unit configured to generate, with the use of a random number, an error according to the first model determined by the first error modeling unit; and
- a first estimation unit configured to estimate the first target variable of the content by using the first metadata estimation formula learned by the first learning unit and the random number generated by the first error generation unit.

* * * * *